United States Patent Office 3,487,160
Patented Dec. 30, 1969

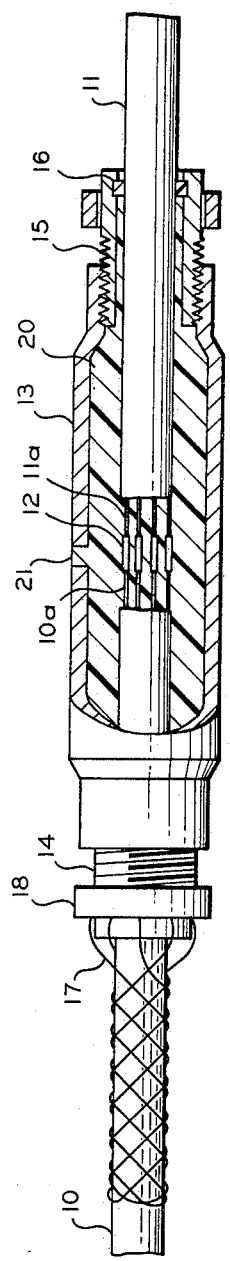
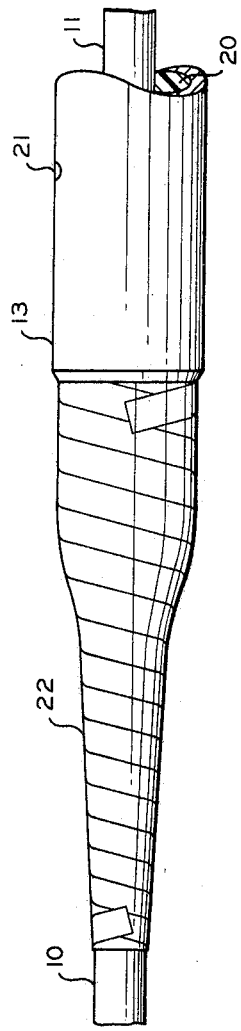
FIG. 1
FIG. 2

3,487,160
CABLE JOINT WITH WOVEN CABLE GRIPPING MEANS
Harry C. Johnsen, Bartlesville, Okla., assignor to Phillips Petroleum Company, a corporation of Delaware
Filed Oct. 4, 1967, Ser. No. 672,921
Int. Cl. H02g 15/08
U.S. Cl. 174—88     3 Claims

ABSTRACT OF THE DISCLOSURE

A cable joint comprises a casting which encloses two cable sections, the individual wires of which have been spliced. A flexible gripping means is secured to each end of the casing and extends therefrom to grip the respective cable sections.

---

This invention relates to the repair and joining of cable sections which contain a plurality of insulated wires.

It is common practice in geophysical prospecting to measure vibrations reflected from subterranean beds by means of seismometers which are locted in spaced relationship along the surface of the earth. A substantial number of seismometers is normally employed for this purpose, which requires connecting cables that contain large numbers of individual wires. These cables are spread along the ground and are often dragged from one location to another. As a result, the cables are frequently subjected to rough handling, severe bending, and even to damage by vehicles or animals. For this reason it is often necessary to splice cable sections in order to repair or remove damaged portions of the cable. Heretofore, this has generally been accomplished by splices wherein the individual wires are cut in staggered relationship. Since the cables often contain thirty or more individual wires, this staggering may extend over a substantial length of the cable. The resulting splices have not always been satisfactory because they do not provide the needed strength or protection. Also, moisture penetration of the joints has been a problem. Other types of cable splices often fail because the spliced section is allowed to bend and flex sharply which can cause one or more of the individual connections to open.

In accordance with this invention, a simple butt splice is provided which can be used in joining a large number of insulated wires in a cable. The individual wires are joined together by soldering or other appropriate means, and the spliced area is enclosed by an elongated casing which provides the desired protection from direct pressure or strain on these connections. A flexible gripping means extends from each end of the casing and encloses the respective cable sections to secure the cable sections to the casing. These flexible gripping means are formed of woven material which serves to grip the enclosed cable sections and prevent the sections from being withdrawn from the casing when tension is applied. The gripping means are of such configuration that they can be released when a compression force is applied. This permits rapid assembly.

Accordingly, it is an object of this invention to provide a simple but reliable cable joint for use with cable sections which contain a plurality of insulated wires.

Another object is to provide apparatus for joining cable sections in such a manner as to provide a joint which has at least as much strength as the original cable.

Other objects, advantages and features of the invention should become apparent from the following detailed description, taken in conjunction with the accompanying drawing in which:

FIGURE 1 is a view, shown partially in section, of the cable joint of this invention. FIGURE 2 illustrates the joint of FIGURE 1 having protective tape applied thereto.

Referring now to the drawing in detail and to FIGURE 1 in particular, there are shown two cable sections 10 and 11. These cable sections are formed of a plurality of individual insulated wires, such as 10a and 11a. The individual wires are surrounded by a flexible sheath which can be formed of a protective insulating material such as polyethylene or polyurethane. In order to make the cable joint of this invention, the outer sheath is removed from the ends of the cable sections to be joined, and the insulation is removed from the ends of the individual wires. The wires are then secured together by any suitable means, such as soldering, twisting, or the use of connectors. Soldering is normally the preferred technique because it provides a relatively strong joint with minimum bulk. The ends of the joined wires are then insulated from one another by the use of tape, such as shown at 12.

The splice thus far described is protected in accordance with this invention by the remainder of the apparatus illustrated in FIGURE 1. A metal casing 13 encloses the two cable sections at the region of the splice. The two ends of casing 13 are threaded to receive respective sleeves 14 and 15. The outer ends of these sleeves can be recessed to receive an O-ring, such as shown at 16. A flexible gripping means 17 fits over the end of each sleeve and is secured thereto by means of a tight fitting bushing, such as 18. Gripping means 17 is formed of a plurality of flexible wires which are woven to encircle cable section 10 in the manner illustrated. This results in a device, sometimes referred to as a "Chinese puzzle," which securely grips the cable section when tension is applied tending to pull the cable section from casing 13. On the other hand, gripping means 17 can be compressed to permit the cable sections to be inserted.

Before the two cable sectors are joined together to make the splice, casing 13 is positioned over one of the cable sections, and the remainder of the fittings are positioned over respective cable sections. After the actual splice is completed, casing 13 is centered and the sleeves are screwed into the ends to form the complete cable joint, as illustrated in FIGURE 1. The interior of the casing 13 is then filled with an electrically insulating material which completely surrounds the spliced cable sections. This material can advantageously be a thermosetting epoxy compound which can be poured into the interior of casing 13 through an opening 21 and solidified. This material provides added strength and prevents moisture intrusion. The final step in forming the cable joint of this invention involves wrapping a tape 22 over the gripping means in the manner illustrated in FIGURE 2. While this tape is not essential to forming the joint, it often serves a valuable purpose in that it covers the open mesh of gripping means 17. This prevents the cable joint from becoming entangled in brush and rocks when the cable is used in the field.

What is claimed is:
1. A cable joint comprising:
   first and second sections of cable, each section being formed of a plurality of insulated wires contained in a sheath, said first and second cable sections being positioned on a common longitudinal axis and having respective first ends adjacent one another, the insulation being removed from the ends of the wires;
   means joining the ends of corresponding wires of said two cable sections and insulating the joined wires from each other;
   an elongated casing enclosing the joined wires and adjacent ends of said two cable sections;
   first and second flexible gripping means secured to said casing and extending from opposite ends thereof so as to enclose and grip said first and second cable sections, respectively, each of said gripping means being formed of a material which is woven so as to (i) grip the enclosed cable section and prevent the cable section from being withdrawn from said casing and (ii) release the enclosed cable section when a force is applied which tends to compress the gripping means in a direction axial of the enclosed cable section; and said casing being provided with threaded ends, a sleeve threaded to each end of said casing, each of said gripping means extending over the end of a respective one of said sleeves, and a bushing enclosing the end of each of said gripping means to secure the same to the associated sleeve.

2. The cable joint of claim 1, further comprising an electrically insulating thermosetting epoxy compound surrounding said cable sections and filling the interior of said casing so as to prevent moisture from entering the interior of said casing.

3. The cable joint of claim 1, further comprising tape wound over the openings in said woven gripping means and extending therefrom to enclose adjacent portions of said casing and said cable sections.

References Cited
UNITED STATES PATENTS

| | | | |
|---|---|---|---|
| 2,845,475 | 7/1958 | Behr et al. | 174—76 XR |
| 3,040,287 | 6/1962 | Agron et al. | |
| 3,112,975 | 12/1963 | Hamel | 339—104 XR |

DARRELL L. CLAY, Primary Examiner

U.S. Cl. X.R.

174—76, 91, 93; 339—101